(No Model.)
C. A. FLOYD.
UMBRELLA HOLDER FOR VEHICLES.
No. 309,841. Patented Dec. 30, 1884.
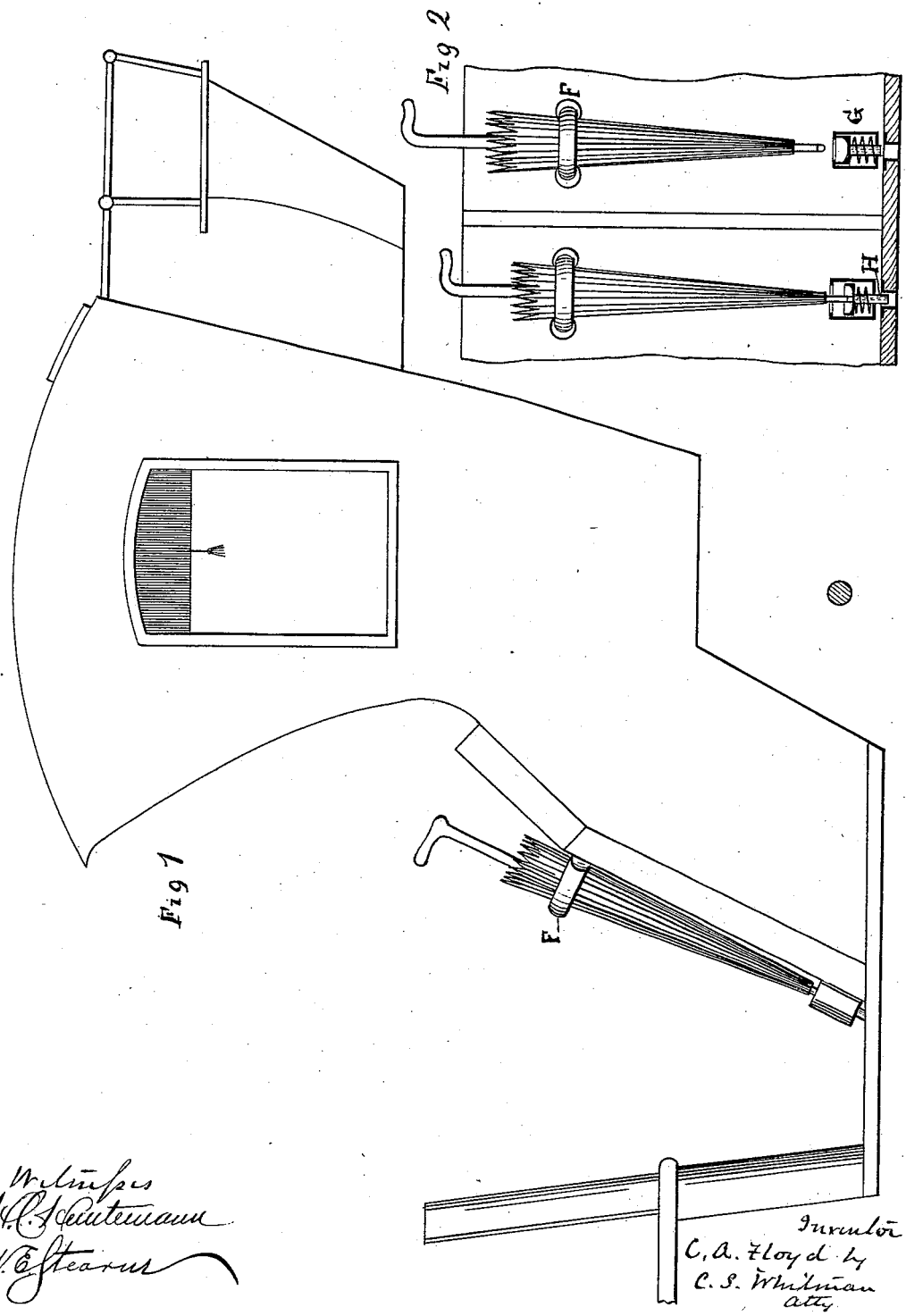

UNITED STATES PATENT OFFICE.

CHARLES ASHBURNHAM FLOYD, OF EASTBOURNE, COUNTY OF SUSSEX, ENGLAND.

UMBRELLA-HOLDER FOR VEHICLES.

SPECIFICATION forming part of Letters Patent No. 309,841, dated December 30, 1884.

Application filed July 25, 1884. (No model.) Patented in England May 7, 1884, No. 7,385.

*To all whom it may concern:*

Be it known that I, CHARLES ASHBURNHAM FLOYD, a citizen of England, residing at Eastbourne, in the county of Sussex, England, have invented an Umbrella-Holder for Vehicles, for which I have obtained Letters Patent of Great Britain No. 7,385, dated May 7, 1884, of which the following is a specification.

In the accompanying drawings, Figure 1 is a side view of a Hansom cab having my improvement applied thereto, and Fig. 2 is a front view of the doors thereof.

For the purpose of accommodating umbrellas in vehicles, which if they happen to be wet would be very objectionable within the vehicle, I make each of the handles F of the doors in the form of a ring large enough to admit of an umbrella being thrust down, so that its point rests in a cup, G, mounted on the door with a spring that can yield a little downward when it is subjected to the weight of the umbrella. Under the cup projects a pin, H, which, when the cup is depressed, enters a hole in the floor of the cab and serves as a bolt, fastening the door, so that the passenger cannot open the door for the purpose of leaving the vehicle until he has withdrawn the umbrella, and so has relieved the cup G of the weight. The spring of the cup, when relieved from the weight, withdraws the bolt H, and then the door can be opened.

Having thus described the nature of my invention and the best means I know of carrying the same into practical effect, I claim—

In a Hansom cab or vehicle of similar form, the construction of the door-handle as a ring, with a cup below it to hold an umbrella, the cup having a spring-bolt attached to it, arranged and operating substantially as and for the purposes herein set forth.

In testimony whereof I have signed my name to this specification, in the presence of two subscribing witnesses, this 10th day of June, A. D. 1884.

C. ASHBM. FLOYD.

Witnesses:
JNO. P. M. MILLARD,
H. STEVENSON.